United States Patent
Ah Sue (10) Patent No.: US 7,620,051 B2
(45) Date of Patent: Nov. 17, 2009

(54) ATM PERMANENT VIRTUAL CIRCUIT AND LAYER 3 AUTO-CONFIGURATION FOR DIGITAL SUBSCRIBER LINE CUSTOMER PREMISES EQUIPMENT

(75) Inventor: John D. Ah Sue, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 663 days.

(21) Appl. No.: 11/136,835

(22) Filed: May 24, 2005

(65) Prior Publication Data
US 2005/0213581 A1 Sep. 29, 2005

Related U.S. Application Data

(63) Continuation of application No. 09/629,318, filed on Jul. 31, 2000, now Pat. No. 6,993,048.

(51) Int. Cl.
*H04L 12/56* (2006.01)
(52) U.S. Cl. .................................. 370/395.1
(58) Field of Classification Search ............... 370/241, 370/241.1, 254, 395.2, 395.3, 395.1
See application file for complete search history.

(56) References Cited

U.S. PATENT DOCUMENTS

| | | | |
|---|---|---|---|
| 5,237,564 A | 8/1993 | Lespagnol et al. | 370/60.1 |
| 5,274,643 A | 12/1993 | Fisk | 370/94.1 |
| 5,305,311 A | 4/1994 | Lyles | 370/60 |
| 5,311,509 A | 5/1994 | Heddes et al. | 370/60 |
| 5,313,454 A | 5/1994 | Bustini et al. | 370/13 |
| 5,327,421 A | 7/1994 | Hiller et al. | 370/60.1 |
| 5,345,445 A | 9/1994 | Hiller et al. | 370/60.1 |
| 5,345,446 A | 9/1994 | Hiller et al. | 370/60.1 |
| 5,365,524 A | 11/1994 | Hiller et al. | 370/94.2 |
| 5,390,170 A | 2/1995 | Sawant et al. | 370/58.1 |
| 5,390,175 A | 2/1995 | Hiller et al. | 370/60 |
| 5,394,402 A | 2/1995 | Ross | 370/94.1 |

(Continued)

FOREIGN PATENT DOCUMENTS

| | | |
|---|---|---|
| WO | 95/20850 | 8/1995 |
| WO | 9520850 | 8/1995 |
| WO | 97/13382 | 4/1997 |
| WO | 9713382 | 4/1997 |
| WO | 97/38511 | 10/1997 |
| WO | 9738511 | 10/1997 |

OTHER PUBLICATIONS

"Auto-configuration of PVCs", The ATM Forum Technical Committee, AF-NM-0122.000, May 1999.*

(Continued)

*Primary Examiner*—Derrick W Ferris
*Assistant Examiner*—Peter Cheng
(74) *Attorney, Agent, or Firm*—BainwoodHuang (57) ABSTRACT

The present invention pertains to a method and device for automatically configuring the Permanent Virtual Circuit (PVC) of a Digital Subscriber Line (DSL) Customer Premises Equipment (CPE) and link it to a software interface. In one embodiment, the CPE configures its new PVC by obtaining a VPI and VCI from a first traffic bearing cell and linking its new PVC to a protocol specific to DSL. In another embodiment, the method comprises receiving an ATM cell and checking the ATM cell for an OAM Fault Management (F5) type cell. The OAM type cell allows the PVC to be configured by obtaining a VPI and VCI from the OAM type cell.

20 Claims, 5 Drawing Sheets

U.S. PATENT DOCUMENTS

| | | | |
|---|---|---|---|
| 5,400,325 | A | 3/1995 | Chatwani et al. ............ 370/60.1 |
| 5,408,469 | A | 4/1995 | Opher et al. ................ 370/60.1 |
| 5,422,882 | A | 6/1995 | Hiller et al. ................. 370/60.1 |
| 5,426,636 | A | 6/1995 | Hiller et al. ................. 370/60.1 |
| 5,428,607 | A | 6/1995 | Hiller et al. ................. 370/60.1 |
| 5,430,715 | A | 7/1995 | Corbalis et al. ............... 370/54 |
| 5,452,297 | A | 9/1995 | Hiller et al. ................. 370/60.1 |
| 5,555,244 | A | 9/1996 | Gupta et al. ................. 370/60.1 |
| 5,583,862 | A | 12/1996 | Callon ......................... 370/397 |
| 5,610,910 | A | 3/1997 | Focsaneanu et al. ......... 370/351 |
| 5,740,176 | A | 4/1998 | Gupta et al. ................. 370/440 |
| 5,742,604 | A | 4/1998 | Edsall et al. ................. 370/401 |
| 5,799,017 | A | 8/1998 | Gupta et al. ................. 370/419 |
| 5,864,542 | A | 1/1999 | Gupta et al. ................. 370/257 |
| 5,883,893 | A | 3/1999 | Rumer et al. ................ 370/395 |
| 5,953,336 | A | 9/1999 | Moore et al. ................. 370/395 |
| 6,028,867 | A | 2/2000 | Rawson et al. |
| 6,115,380 | A | 9/2000 | Christie et al. |
| 6,240,107 | B1 | 5/2001 | Glass, III et al. |
| 6,285,671 | B1 | 9/2001 | Bossemeyer, Jr. et al. |
| 6,411,622 | B1 * | 6/2002 | Ohgane ................... 370/395.1 |
| 6,430,187 | B1 * | 8/2002 | Park ........................... 370/397 |
| 6,480,494 | B1 | 11/2002 | Hawley |
| 6,538,998 | B1 | 3/2003 | Garimella |
| 6,563,827 | B1 | 5/2003 | Brueckheimer et al. |
| 6,584,074 | B1 * | 6/2003 | Vasamsetti et al. .......... 370/254 |
| 6,597,689 | B1 | 7/2003 | Chiu et al. |
| 6,636,505 | B1 | 10/2003 | Wang et al. |
| 6,671,278 | B1 * | 12/2003 | McBride et al. ........ 370/395.41 |
| 6,714,972 | B1 | 3/2004 | Lee et al. |
| 6,778,505 | B1 | 8/2004 | Bullman et al. |
| 6,874,041 | B1 | 3/2005 | Burd et al. |
| 6,975,597 | B1 | 12/2005 | Baker et al. |
| 6,993,048 | B1 | 1/2006 | Ah Sue |
| 7,215,670 | B1 | 5/2007 | Karlsson et al. |
| 7,392,301 | B1 | 6/2008 | Perry, Jr. et al. |
| 2002/0101881 | A1 | 8/2002 | Sundaresan et al. |
| 2003/0026273 | A1 | 2/2003 | Davison et al. |
| 2005/0157711 | A1 * | 7/2005 | O'Dell et al. ................ 370/386 |

OTHER PUBLICATIONS

Cisco 6400 Access Concentrators, printed from http://www.cisco.com/warp/public/cc/pd/as/6400/index.shtml on Sep. 27, 2000.

Cisco 6400 Series Universal Access Concentrator, Data Sheet, printed from http://www.cisco.com/warp.public.cc.pd.as.6400.prodlit/6400_ds.htm on Sep. 27, 2000.

Cisco 6400 Universal Access Concentrator, Product Bulletin—No. 1120, printed from http:/www.cisco.com/warp/public/cc/pd/as/6400/prodlit/1120_pp.htm on Oct. 4, 2000.

Cisco Asymmetric Digital Subscriber Line Services Architecture, White Paper, printed from http//www.cisco.com/warp.public/cc/so/neso/dsso/global/adsl_wp.htm on Sep. 27, 2000.

Esaki, et al., "Datagram Delivery in an ATM-Internet", Mar. 1994, IEICE Trans. Commun., vol. E77-B, No. 3, pp. 314-326.

Layer 2 Tunnel Protocol, Release 12.0(1)T and 11.3(5)AA.

"L2TP", 1998, Mecklermedia Corporation, printed from http://webopedia.internet.com/TERM/L/L2TP/html.

"MultiVPN from Ascend Communications: Breaking Down the Barriers to VPNs", Ascend Communications, Inc., White Paper, 1998.

Patel, B., et al., "Securing L2TP using IPSEC", May 1998, PPPEXT Working Group, pp. 1-10, printed from http://www.masinter.net/~12tp/ftp/draft-ietf-pppext-12tp-security-02.txt. on Sep. 21, 1998.

Valencia, et al., "Layer Two Tunneling Protocol 'L2TP", PPP Working Group, May 1998.

Cisco 6400 Access Concentrators, printed from http://www.cisco.com/warp/public/cc/pd/as/6400/index.shtml on Sep. 27, 2000.

Cisco 6400 Series Universal Access Concentrator, Data Sheet, printed from http://www.cisco.com/warp.public.cc.pd.as.6400.prodlit/6400_ds.htm on Sep. 27, 2000.

Cisco 6400 Universal Access Concentrator, Product Bulletin - No. 1120, printed from http:/www.cisco.com/warp/public/cc/pd/as/6400/prodlit/1120_pp.htm on Oct. 4, 2000.

Cisco Asymmetric Digital Subscriber Line Services Architecture, White Paper, printed from http" //www.cisco.com/warp.public/cc/so/neso/dsso/global/adsl_wp.htm on Sep. 27, 2000.

Esaki, et al., "Datagram Delivery in an ATM-Internet", Mar. 1994, IEICE Trans. Commun., vol. E77-B, No. 3, pp. 314-326.

Layer 2 Tunnel Protocol, Release 12.0(1)T and 11.3(5)AA, 1999.

"L2TP", 1998, Mecklermedia Corporation, printed from http://webopedia.internet.com/TERML/L2TP/html.

"MultiVPN from Ascend Communications: Breaking Down the Barriers to VPNs", Ascend Communications, Inc., White Paper, 1998.

Patel, B., et al., "Securing L2TP using IPSEC", May 1998, PPPEXT Working Group, pp. 1-10, printed from http://www.masinter.net/~12tp/ftp/draft-ietf-pppext-12tp-security-02.txt. on Sep. 21, 1998.

Valencia, et al., "Layer Two Tunneling Protocol 'L2TP", PPP Working Group, May 1998.

* cited by examiner

ATM PERMANENT VIRTUAL CIRCUIT AND LAYER 3 AUTO-CONFIGURATION FOR DIGITAL SUBSCRIBER LINE CUSTOMER PREMISES EQUIPMENT

CROSS REFERENCE TO RELATED APPLICATION

This application is a continuation application based on U.S. patent application Ser. No. 09/629,318, filed on Jul. 31, 2000, now U.S. Pat. No. 6,993,048, issued on Jan. 31, 2006.

FIELD OF THE INVENTION

The present invention relates generally to a Customer Premises Equipment (CPE) device having its Asynchronous Transfer Mode (ATM) interface automatically configured. More specifically, the present invention relates to a method for configuring a Permanent Virtual Circuit (PVC) and Layer 3 of a CPE device over an ATM interface.

BACKGROUND OF THE INVENTION

ATM is a packet-switching technology that uses fixed-size packets, referred to as cells, to carry the traffic in a network. The ATM standard allows transmission of intermixed audio, video, and data over high-speed links. As well as being used in wide-area networks, the ATM standard can be used for local-area networks to support multimedia applications.

Figure 1:
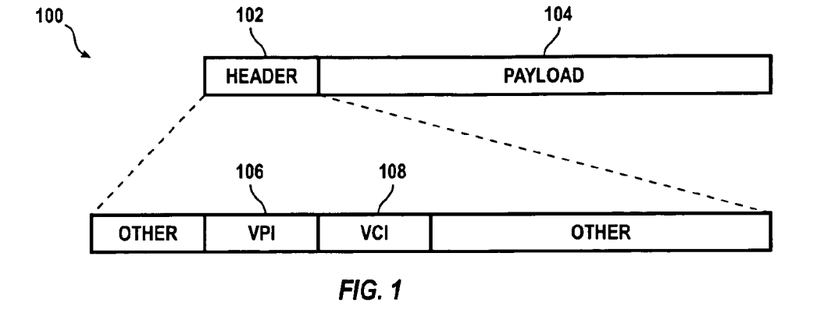
FIG. 1 is a schematic diagram illustrating the composition of an ATM cell including in detail its header.

The unit of transmission used in the ATM standard is a cell. As shown in FIG. 1, an ATM cell 100 contains 53 bytes of information and has a five-byte header field 102 and a 48-byte payload field 104 carrying data. Header field 102 contains a Virtual Path Identifier (VPI) 106 and a Virtual Channel Identifier (VCI) 108 which are used for switching cell 100 through an ATM network. ATM header field 102 uniquely determines parameters associated with a given connection. Within an end user interface such as a computer, multiple connections can be going on at the same time.

Within a switch, each ATM cell is switched based on the information contained in its header; more specifically based on its VPI and VCI as shown in FIG. 1. A combination of VCI and VPI bits are used to index lookup tables that contain the switching information.

Figure 2:
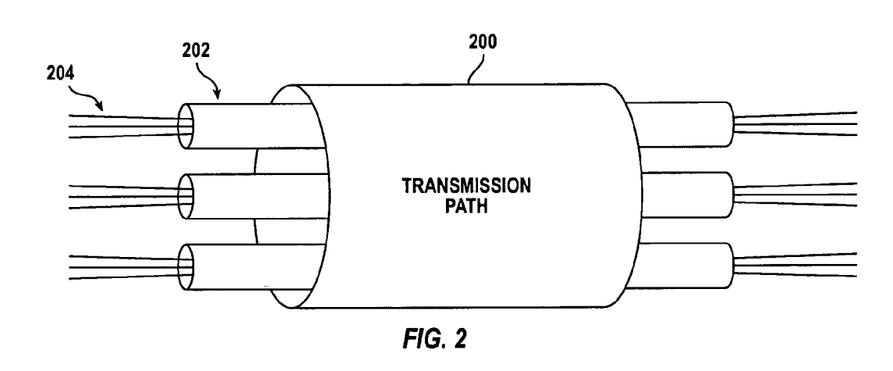
FIG. 2 is a schematic diagram illustrating Virtual Circuits and Virtual Paths within a transmission path in an ATM network.

FIG. 2 illustrates the relationship between a physical transmission circuit 200 and a Virtual Path (VP) 202 and a Virtual Channel (VC) 204. Physical circuit 200 supports one or more virtual paths 202. Virtual path 202 may support one or more virtual channels 204. Thus, multiple virtual channels can be trunked over a single virtual path 202. ATM switching and multiplexing operate at either the virtual path or virtual channel level.

ADSL Customer Premises Equipment is usually configured with one Permanent Virtual Circuit (PVC) over which PPP or bridged request for comments (RFC) 1483 protocol traffic is supported. The RFC 1483 protocol is dated July 1993 published by Telecom Finland. In a PVC network, such as ATM, when a circuit is established, the route is chosen from source to destination, and all switches (e.g. routers) along the way may take entries so that they can switch any cells on that virtual circuit. When a cell comes along, a switch inspects the cell's header to find out which virtual circuit it belongs to. Then it looks up that virtual circuit in its tables to determine which output communication line to direct cell to. Therefore, there is an agreement between a customer and a service provider that the switches will always hold table entries for a particular destination, even if there has been no traffic for months.

Figure 3:
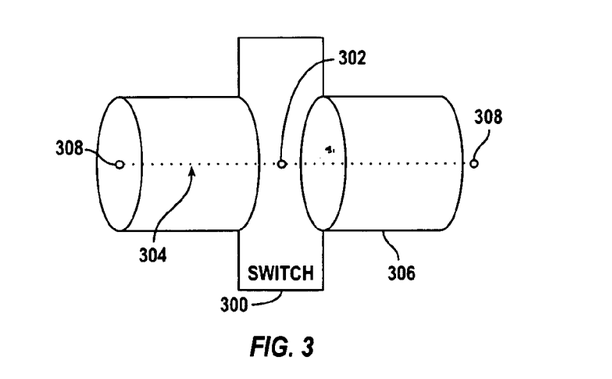
FIG. 3 is a schematic diagram illustrating Virtual Path Identifier and Virtual Channel Identification switching in an ATM node or switch.

FIG. 3 illustrates ATM cell switching using VPI and VCI values. Switch 300 maps VPIs and VCIs to different VPIs and VCIs at a connecting point 302. The network therefore ties together the VPIs and VCIs used on a link 304 within a physical transmission path 306 to deliver an end-to-end connection to end points 308.

Figure 4:
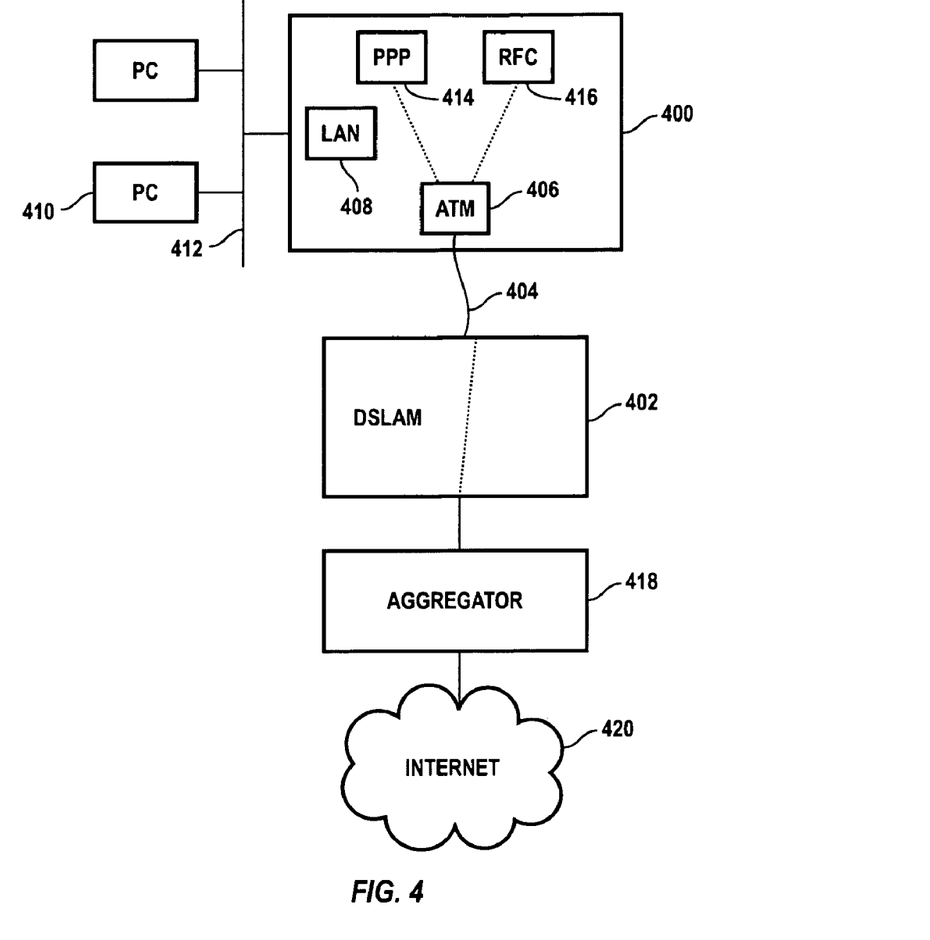
FIG. 4 is a block, diagram illustrating an end user network in an ATM circuit.
Figure 5:
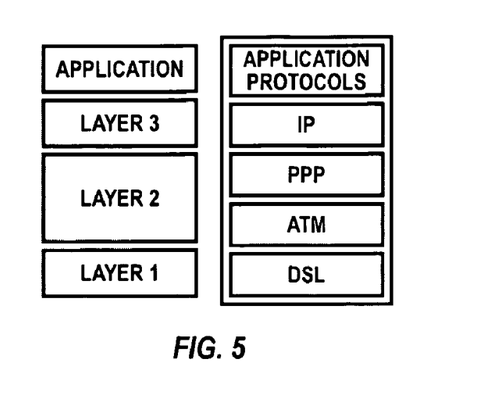
FIG. 5 is a schematic diagram illustrating the protocol layers in a DSL connection.

In an end-user network such as the one illustrated in FIG. 4, a CPE device 400 communicates with a remote Digital Subscriber Line Access Multiplexer (DSLAM) 402 through a transmission path 404 having a PVC defined by a VPI and a VCI. DSLAM 402 communicates with an aggregator 418 connected to the Internet 420. CPE device 400 typically comprises of an ATM interface 406 and a LAN interface 408 connected to a network of PCs 410 through an Ethernet 412. Although CPE device 400 can have ATM interface 406 dynamically configured with IPCP address negotiation and DHCP client support that belong to layer 3 of a DSL protocol stack as shown in FIG. 5, the ATM PVC still needs to be pre-configured with a VPI and a VCI. A service provider deploying its CPE device actually knows the VPI and VCI for the PVC. However, a customer replacing, for example, a bridge with a router, may not know the VPI and VCI of the PVC that he or she is using. A second problem arises when CPE device 400 must determine a type of encapsulation, e.g. PPP over ATM software interface 414 or RFC 1483 bridge 416.

A need therefore exists for a method and a device that enable a CPE device to automatically configure its PVC and then link it to an interface such as PPP or RFC bridging so that both layer 2 (ATM PVC) and layer 3 (DHCP or IPCP) auto-configuration is achieved. Thus, a customer who buys the CPE device would not need to contact the service provider to find out about the VPI and VPC for the PVC. If the service provider sends RFC 1483 bridged traffic or PPP traffic (assuming that CHAP or PAP is not used), the customer would just need to plug the CPE device in and allow it to auto-configure itself.

BRIEF SUMMARY OF THE INVENTION

The present invention pertains to a method and device for automatically configuring the Permanent Virtual Circuit (PVC) of a Digital Subscriber Line (DSL) Customer Premises Equipment (CPE) and link it to a software interface. The method comprises receiving an ATM cell and checking the ATM cell for an OAM Fault Management (F5) type cell. The OAM type cell allows the PVC to be configured by obtaining a VPI and VCI from the OAM type cell. Otherwise, the CPE configures its new PVC by obtaining a VPI and VCI from a first traffic bearing cell and linking its new PVC to a protocol specific to DSL.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION OF THE INVENTION

Various exemplary embodiments of the present invention are described herein in the context of an ATM permanent virtual circuit and Layer 3 auto-configuration for digital subscriber line customer premises equipment. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will, of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems, computing platforms, firmware, computer programs, computer languages, and/or general-purpose machines. The method can operate as a programmed process running on processing circuitry. The processing circuitry can take the form of numerous combinations of processors and operating systems or the form of a stand-alone device. The process can be implemented as instructions executed by such hardware, hardware alone, or any combination thereof. The software may be stored on a computer-readable medium.

In addition, one of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer. The method may also be implemented in a computing environment including various peripherals such as input devices, output devices, displays, pointing devices, memories, storage devices, media interfaces for transferring data to and from the computer, and the like. In addition, the computing environment may be networked.

In the context of the present invention, the term "network" includes local area networks (LANs), wide area networks (WANs), the Internet, cable television systems, telephone systems, wireless telecommunications systems, fiber optic networks, ATM networks, frame relay networks, satellite communications systems, and the like. Such networks are well known in the art and consequently are not further described herein.

Figure 6:
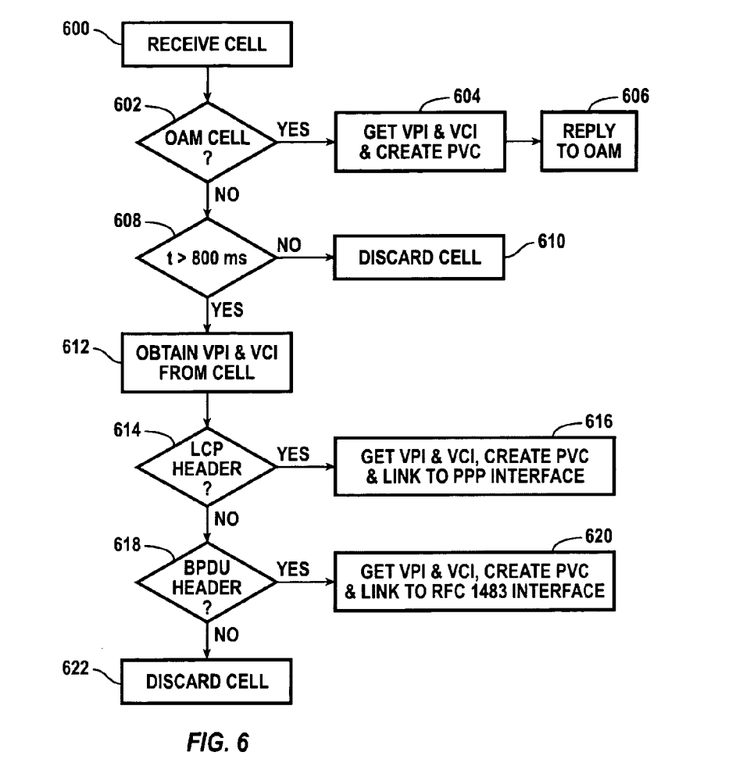
FIG. 6 is a flow chart illustrating a method to automatically configure PVC and layer 3 in accordance with a specific embodiment of the present invention.

FIG. 4 is a block diagram illustrating an end user network in an ATM circuit. FIG. 5 is a schematic diagram illustrating the protocol layers in a DSL connection. FIG. 6 is a flow chart illustrating a method to automatically configure a Permanent Virtual Circuit of a Digital Subscriber Line CPE and layer 3. Referring now to FIGS. 4, 5, and 6, a CPE device 400 that automatically configures its PVC would perform the following steps.

Figure 7:
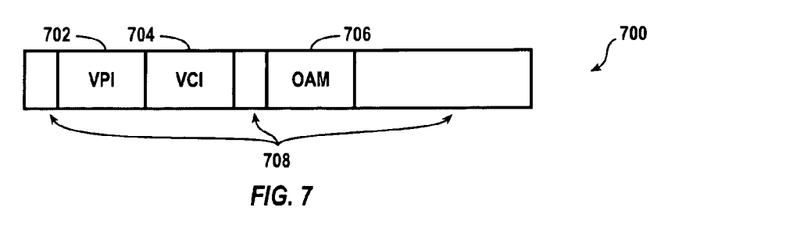
FIG. 7 is a schematic diagram illustrating an Asynchronous Data Transmission of cells in an ATM circuit.

At step 600, CPE 400 receives a cell from a DSLAM 402 through a physical transmission path 404. At step 602, CPE 400 examines the received cell. If the received cell is determined to be an Operations and Maintenance (OAM) cell, step 604 is performed. OAM cells are special purpose cells whose function provide a set of diagnostic and alarm reporting mechanisms such as fault management. As illustrated in FIG. 7, an OAM cell 700 includes a VPI 702, a VCI 704, an OAM field 706 and other fields 708. CPE 400 therefore can identify whether it received OAM cell 700 by looking at the received cell content for OAM field 706. At step 604, CPE 400 may grab VPI 702 and VCI 704 from OAM cell 700 and therefore create a PVC since both VPI and VCI are known. Once the PVC is created, CPE 400 replies to OAM cell 700 according to its function whether it is fault management or performance management at step 606. Otherwise, if the received cell is not an OAM cell, step 608 is performed.

Figure 8:
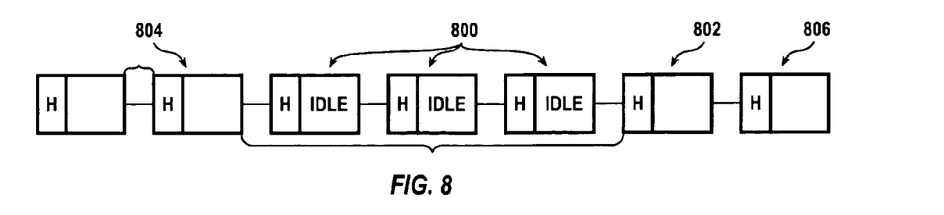
FIG. 8 is a schematic diagram illustrating an ATM cell containing an OAM function.

At step 608, CPE 400 determines whether the received cell is a first cell of a packet by measuring the elapse time between the received cell and a previous cell on the same PVC. FIG. 8 illustrates the flow of cells in an asynchronous transmission. Although idle cells 800 separate traffic bearing cells 802 and 804, idle cells 800 are discarded automatically by physical layer of CPE 400. The elapse time between traffic bearing cells 802 and 806 is usually less than 50 ms whereas the elapsed time between the first cell of a BPDU (PPP) packet and the last call of the previous BPDU (PPP) packet is more than 800 ms. At step 610, once CPE 400 determines that the elapse time between traffic bearing cells is less than 800 ms, CPE 400 discards the received cell through a buffer. Otherwise, if the received cell is first traffic bearing cell 802 following idle cells 800, step 612 is performed.

At step 612, CPE 400 can then grab the VPI and VCI from the received cell because traffic bearing cells contain VPI and VCI in their header as previously illustrated in FIG. 1.

When a Service Provider configures an aggregate router, such as aggregator 418, to support protocols such as PPP or bridged RFC 1483 over ATM, CPE 400 receives many messages from the aggregate router. In the case of PPP over ATM protocol, CPE 400 receives regular Link Control Protocol (LCP) configuration requests messages. In the case of bridged RFC 1483, CPE 400 receives regular (Bridge Protocol Data Unit) BPDU spanning tree messages. Instead of discarding the received ATM cells containing these messages because no PVC is configured, CPE 400 can instead look inside these cells and try to determine whether they contain a valid LCP header or a BPDU header.

Figure 9:
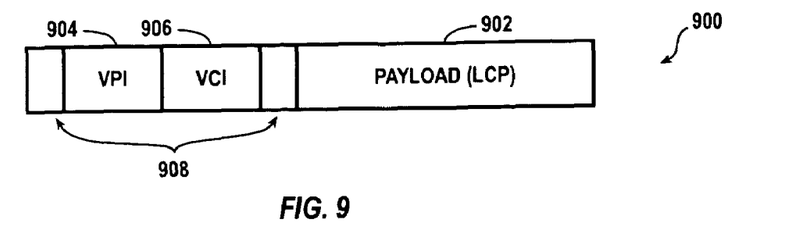
FIG. 9 is a schematic diagram illustrating a cell transmitted through an aggregate router to support PPP over ATM.

At step 614, CPE 400 determines whether the received cell contains an LCP header as shown in FIG. 9. In a cell 900 containing an LCP header, a payload 902 has its protocol values set to LCP. LCP Cell 900 also contains other fields 908. When a cell containing an LCP header is received, step 616 is performed. At step 616, CPE 400 looks at the received LCP cell 900 to obtain VPI 904 and VCI 906 enabling configuration of a new PVC only if VPI 904 and VCI 906 of PPP PVC are the same as VPI 702 and VCI 704 of OAM cell 700. Once the new PVC is configured, CPE 400 links the new PVC to PPP interface module 414, as shown in FIG. 4, so as to bring up the PPP interface to start layer 3 auto-configuration. Otherwise, if the received cell does not contain a LCP, CPE 400 performs step 618.

Figure 10:
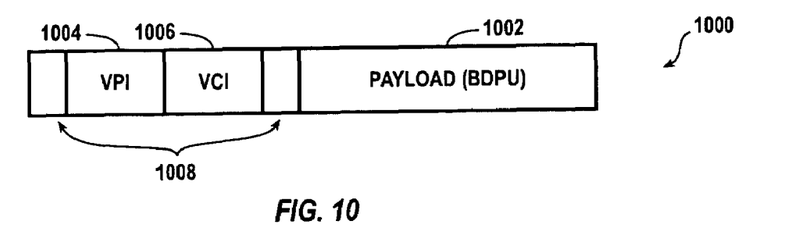
FIG. 10 is a schematic diagram illustrating a composition of a cell transmitted through an aggregate router to support bridged RFC 1483 over ATM.

At step 618, CPE 400 determines whether the received cell contains a BPDU header as shown in FIG. 10. In a cell 1000 containing a BPDU header, a payload 1002 has its protocol values set to BPDU. BPDU cell 1000 also contains other fields 1008. When a cell containing a BPDU header is received, step 620 is performed. At step 620, CPE 400 looks at the received BPDU cell 1000 to obtain VPI 1004 and VCI 1006 enabling configuration of a new PVC only if VPI 1004 and VCI 1006 of BPDU PVC are the same as VPI 702 and VCI 704 of OAM cell 700. Once the new PVC is configured, CPE 400 links the new PVC to RFC interface module 416, as shown in FIG. 4, so as to bring up the RFC 1483 bridged interface to start layer 3 auto-configuration. Otherwise, if the received cell does not contain BPDU, the received cell is discarded at step 622.

Another implementation of the present invention may be in the form of a program storage device readable by a machine, embodying a program of instructions, executable by the machine to perform a method for auto-configuring a Permanent Virtual Circuit (PVC) of a customer premises equipment device over an Asynchronous Transfer Mode (ATM) network.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

Figure 11:
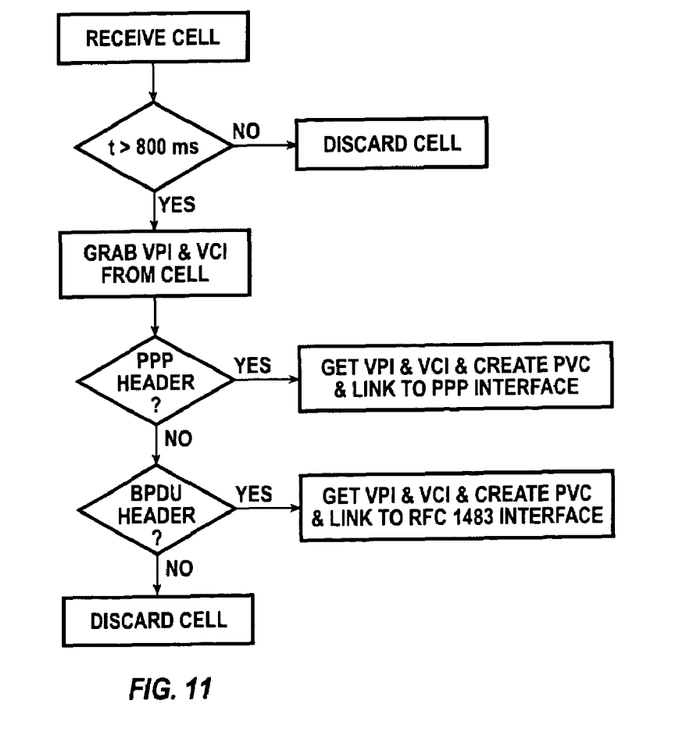
FIG. 11 is a flow chart illustrating a method to automatically configure PVC and layer 3 in accordance with an alternative embodiment of the present invention.
Figure 12:
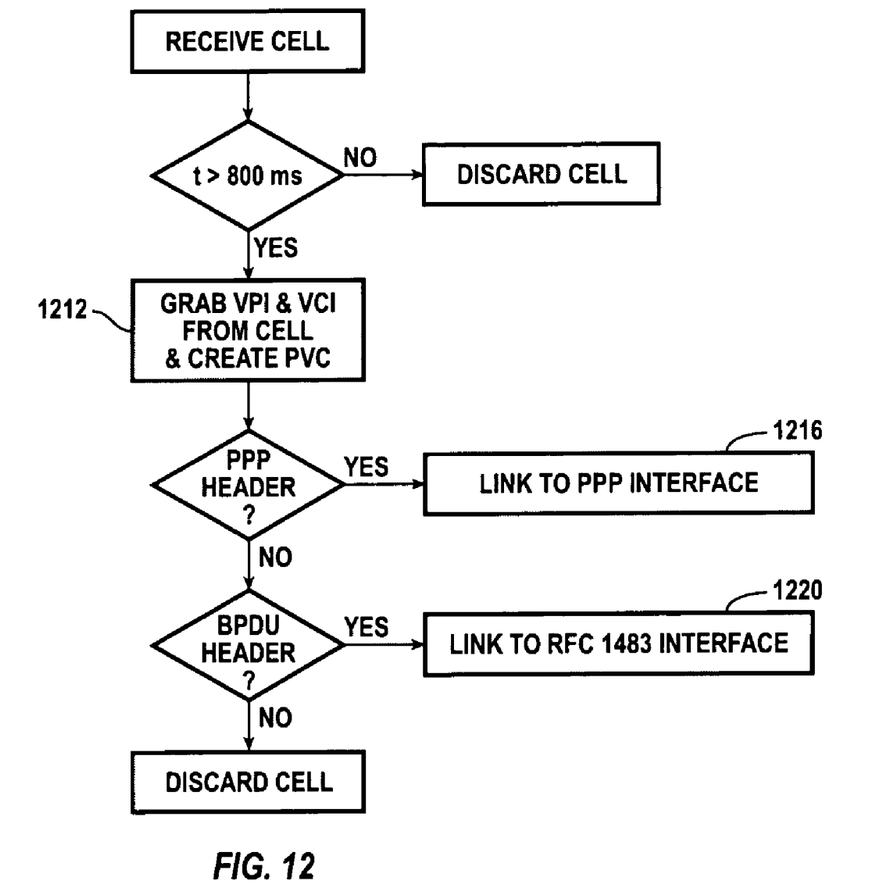
FIG. 12 is a flow chart illustrating a method to automatically configure PVC and layer 3 in accordance with an alternative embodiment of the present invention.

For example, FIG. 11 illustrates an alternative embodiment of the present invention. OAM cells are not identified by CPE device 400 since they are likely not to be received by CPE device 400. FIG. 12 illustrates another alternative embodiment of the present invention. At step 1212, after determining the VPI and VCI, CPE device 400 may create the new PVC in the same step 1212 instead of waiting until step 1216 or step 1220 when the new PVC is linked to PPP interface or RFC 1483 interface.

In addition, the present invention is not limited to protocol such as PPP or RFC 1483 but may be applied to any other protocol specific to DSL that sends periodically cells that are differentiable.

What is claimed is:

1. A method for a customer premises equipment (CPE) device to auto-configure itself, the CPE device being coupled to an Asynchronous Transfer Mode (ATM) network, the ATM network having a preexisting Permanent Virtual Circuit (PVC) to which the CPE device is to be self auto-configured, the method comprising:
   receiving a plurality of ATM cells from a digital subscriber line access multiplexer;
   checking the plurality of received ATM cells to identity a first ATM cell of a particular type of a packet, the first ATM cell including a header and a payload, the header including a Virtual Path Identifier (VPI) and a Virtual Circuit Identifier (VCI),
   wherein identifying the first ATM cell includes:
      measuring an elapsed time between a previous ATM cell and a current ATM cell received by the CPE device,
      detecting the current ATM cell as the first ATM cell if the elapsed time has a first value relative to a threshold value and extracting the VPI and the VCI from the first ATM cell, and
      discarding through a buffer the current ATM cell if the elapsed time has a second value relative to the threshold value;
   configuring directly the PVC of the CPE device by having the CPE device by itself obtain the VPI and the VCI extracted from the first ATM cell, wherein configuring does not involve Switched Virtual Circuit translation; and
   linking the PVC to a protocol, the protocol being applicable to a Digital Subscriber Line.

2. The method of claim 1, wherein the threshold of the elapsed time between the previous ATM cell and the current ATM cell is at least 800 milliseconds.

3. The method of in claim 1, wherein the protocol further includes a Point-to-Point Protocol interface or a Request-For-Comments 1483 bridge interface.

4. The method of claim 1, further comprising receiving a plurality of messages from an aggregate router, the plurality of messages being a plurality of Link Control Protocol configuration requests or a plurality of Bridge Protocol Data Unit spanning tree messages.

5. The method of claim 1, wherein the linking further includes configuring a Dynamic Host Configuration Protocol or an IPCP configuration once the configured PVC is linked to a PPP module or a bridging module.

6. The method of claim 1, comprising, prior to discarding the current ATM cell through the buffer, examining the header of the current ATM cell and detecting the current ATM cell as being the first ATM cell when the current ATM cell contains a Link Control Protocol (LCP) header.

7. The method of claim 1, comprising, prior to discarding the current ATM cell through the buffer, examining the header of the current ATM cell and detecting the current ATM cell as being the first ATM cell when the current ATM cell contains a Bridge Protocol Data Unit (BPDU) header.

8. A customer premises equipment device coupled to an Asynchronous Transfer Mode (ATM) network, the device being capable of auto-configuring itself over the ATM network, the ATM network having a preexisting Permanent Virtual Circuit (PVC) to which the device is to be auto-configured, the device comprising:
   means for receiving a plurality of ATM cells from a digital subscriber line access multiplexer;
   means for checking the plurality of received ATM cells to identify a first ATM cell of a particular type of a packet, the first ATM cell including a header and a payload, the header including a Virtual Path Identifier (VPI) and a Virtual Circuit Identifier (VCI), wherein identifying the first ATM cell includes:
measuring an elapsed time between a previous ATM cell and a current ATM cell received by the CPE device,
detecting the current ATM cell as the first ATM cell if the elapsed time has a first value relative to a threshold value and extracting the VPI and the VCI from the first ATM cell, and
discarding through a buffer the current ATM cell if the elapsed time has a second value relative to the threshold value;

means for configuring directly the PVC of the CPE device by having the CPE device by itself obtain the VPI and the VCI extracted from the first ATM cell, wherein configuring does not involve Switched Virtual Circuit translation; and means for linking the PVC to a protocol, the protocol being applicable to a Digital Subscriber Line.

9. The device of claim 8, wherein the threshold of the elapsed time between the previous ATM cell and the current ATM cell is at least 800 milliseconds.

10. The Customer Premises Equipment device of claim 8, wherein identifying the first ATM cell includes prior to discarding the current ATM cell through the buffer, examining the header of the current ATM cell and detecting the current ATM cell as being the first ATM cell when the current ATM cell contains one of a Link Control Protocol (LCP) header and a Bridge Protocol Data Unit (BPDU) header.

11. A program storage device readable by a computer, embodying a program of instructions, executable by the computer to perform a method for a customer premises equipment (CPE) device to auto-configure itself, the CPE device being coupled to an Asynchronous Transfer Mode (ATM) network, the ATM network having a preexisting Permanent Virtual Circuit (PVC) to which the CPE device is to be self auto-configured, the method comprising:
receiving a plurality of ATM cells from a digital subscriber line access multiplexer;
checking the plurality of received ATM cells to identify a first ATM cell of a particular type of a packet, the first ATM cell including a header and a payload, the header including a Virtual Path Identifier (VPI) and a Virtual Circuit Identifier (VCI),
wherein identifying the first ATM cell includes:
measuring an elapsed time between a previous ATM cell and a current ATM cell received by the CPE device,
detecting the current ATM cell as the first ATM cell if the elapsed time has a first value relative to a threshold value and extracting the VPI and the VCI from the first ATM cell, and
discarding through a buffer the current ATM cell if the elapsed time has a second value relative to the threshold value;
configuring directly the PVC of the CPE device by having the CPE device by itself obtain the VPI and the VCI extracted from the first ATM cell, wherein configuring does not involve Switched Virtual Circuit translation; and
linking the PVC to a protocol, the protocol being applicable to a Digital Subscriber Line.

12. The program storage device of claim 11, wherein the threshold of the elapsed time between the previous ATM cell and the current ATM cell is at least 800 milliseconds.

13. The program storage device of claim 11, wherein the protocol further includes a Point-to-Point Protocol interface or a Request-For-Comments 1483 bridge interface.

14. The program storage device of claim 11, further comprising receiving a plurality of messages from an aggregate router, the plurality of messages being a plurality of Link Control Protocol configuration requests or a plurality of Bridge Protocol Data Unit spanning tree messages.

15. The program storage device of claim 11, wherein the linking further includes configuring a Dynamic Host Configuration Protocol or an IPCP configuration once the configured PVC is linked to a PPP module or a bridging module.

16. The program storage device of claim 11, wherein identifying the first ATM cell includes prior to discarding the current ATM cell through the buffer, examining the header of the current ATM cell and detecting the current ATM cell as being the first ATM cell when the current ATM cell contains one of a Link Control Protocol (LCP) header and a Bridge Protocol Data Unit (BPDU) header.

17. An Asynchronous Transfer Mode (ATM) communications system comprising:
a digital subscriber line access module receiving a plurality of ATM cells; and
a customer premises equipment device having a mechanism which directly auto-configures to a preexisting Permanent Virtual Circuit (PVC), the mechanism receiving a plurality of ATM cells, the mechanism checking the plurality of received ATM cells to identify a first ATM cell of a particular type of a packet, the first ATM cell including a header and a payload, the header including a Virtual Path Identifier (VPI) and a Virtual Circuit Identifier (VCI), wherein identifying the first ATM cell includes: measuring an elapsed time between a previous ATM cell and a current ATM cell received by the CPE device, detecting the current ATM cell as the first ATM cell if the elapsed time has a first value relative to a threshold value and extracting the VPI and the VCI from the first ATM cell, and discarding through a buffer the current ATM cell if the elapsed time has a second value relative to the threshold value, the mechanism configuring directly the PVC by obtaining by itself the VPI and the VCI extracted from the first ATM cell, wherein configuring does not involve Switched Virtual Circuit translation, and the mechanism linking the PVC to a protocol, the protocol being applicable to a Digital Subscriber Line.

18. The system of claim 17, wherein the threshold of the elapsed time between the previous ATM cell and the current ATM cell is at least 800 milliseconds.

19. The system of claim 17, wherein the customer premises equipment device further receives a plurality of messages from an aggregate router, the plurality of messages being a plurality of Link Control Protocol configuration requests or a plurality of Bridge Protocol Data Unit spanning tree messages.

20. The system of claim 17, wherein identifying the first ATM cell includes prior to discarding the current ATM cell through the buffer, examining the header of the current ATM cell and detecting the current ATM cell as being the first ATM cell when the current ATM cell contains one of a Link Control Protocol (LCP) header and a Bridge Protocol Data Unit (BPDU) header.

* * * * *

UNITED STATES PATENT AND TRADEMARK OFFICE
CERTIFICATE OF CORRECTION

PATENT NO.       : 7,620,051 B2                              Page 1 of 1
APPLICATION NO. : 11/136835
DATED            : November 17, 2009
INVENTOR(S)      : John D. Ah Sue It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 973 days.

Signed and Sealed this

Fourteenth Day of December, 2010

David J. Kappos
*Director of the United States Patent and Trademark Office*